Figure 1:
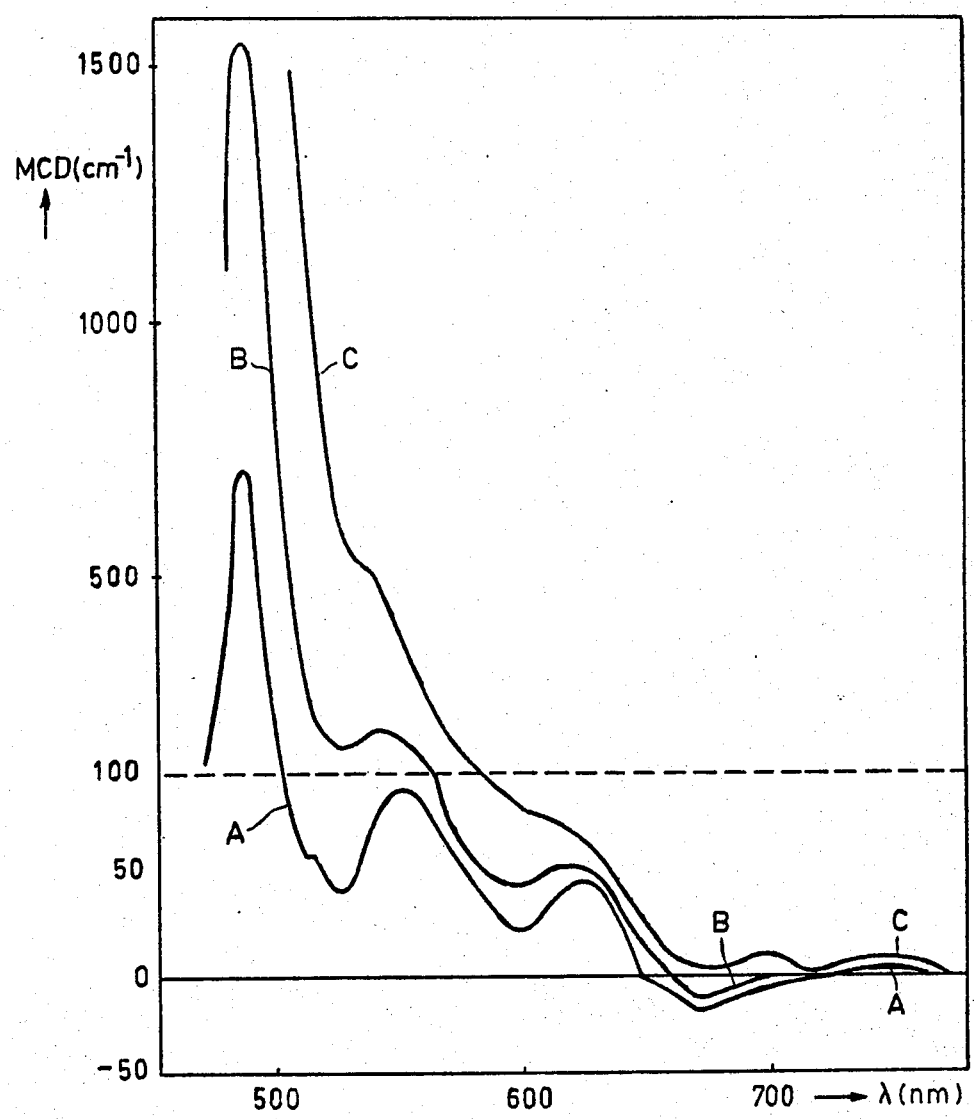

United States Patent
Lacklison et al.

[11] 3,989,352
[45] Nov. 2, 1976

[54] BISMUTH SUBSTITUTED RARE EARTH GARNETS AS MAGNETO-OPTIC MATERIALS EXHIBITING MAGNETIC CIRCULAR DICHROISM

[75] Inventors: David Edward Lacklison; John Lincoln Page; Hugh Ivor Ralph; George Blair Scott, all of Redhill, England

[73] Assignee: U.S. Philips Corporation, New York, N.Y.

[22] Filed: Apr. 24, 1974

[21] Appl. No.: 463,736

[30] Foreign Application Priority Data
Apr. 26, 1973  United Kingdom............... 19899/73

[52] U.S. Cl................................. 350/151; 350/157
[51] Int. Cl.$^2$.......................................... G02F 1/09
[58] Field of Search............................ 350/151, 157; 252/62.56, 62.57, 62.58, 62.59; 356/114

[56] References Cited
UNITED STATES PATENTS

| | | | |
|---|---|---|---|
| 3,281,363 | 10/1966 | Geller et al. | 252/62.59 X |
| 3,558,214 | 1/1971 | DeLang et al. | 350/151 X |
| 3,637,289 | 1/1972 | Dillon et al. | 350/151 |

OTHER PUBLICATIONS

Krinchik et al. "Results of Magneto-Optical Investigation of Rare Earth Iron Garnets", *Journal of Applied Physics* vol. 35, No. 3, Mar. 1964, pp. 1014–1017.

*Primary Examiner*—John K. Corbin
*Assistant Examiner*—Richard A. Rosenberger
*Attorney, Agent, or Firm*—Frank R. Trifari; Carl P. Steinhauser

[57] ABSTRACT

A magneto-optic device employing-optic rotation element having a large magnetic circular dichroism (MCD) and consisting of a bismuth-substituted garnet of the composition:

$$R_{3-x} Bi_x Fe_{5-y} A_y O_{12}$$

where R is $v$, Nd, Sm, Eu, Gd; $0.2 < x < 2.0$; A is Ga or Al and $0 < y < 1.5$; or, A is In or Sc and $0 < y < 0.8$.

3 Claims, 2 Drawing Figures

BISMUTH SUBSTITUTED RARE EARTH GARNETS AS MAGNETO-OPTIC MATERIALS EXHIBITING MAGNETIC CIRCULAR DICHROISM

The invention relates to a magneto-optic device, for example, a magneto-optic memory or modulator, comprising a transparent magneto-optic rotation element, a device to convey through the element a circularly polarized light beam, and a device to detect intensity variations of the passed light beam caused by differences in the magnetization condition of the element. The influencing of the intensity of the passed circularly polarized light beam by the magnetization state of the element is a result of the fact that an element is used which shows magnetic circular dichroism.

Magnetic circular dichroism (MCD) is defined as being the difference in absorption coefficient for left circularly and right circularly polarized light. When using MCD, the light to be used is generally restricted to the ultra-violet region of the spectrum. The present invention discloses a range of materials in which the use of MCD in magneto-optic devices of the above-mentioned kind can be extended to wavelengths in the visible part of the spectrum.

For that purpose the present invention is characterized in that the rotation element consists of a magnetic garnet material having the composition $R_{3-x}Bi_xFe_{5-y}A_yO_{12}$, where R = Y, Nd, Sm, Eu, Gd; $0.2 < x < 2.0$ and
A = Ga, Al; $0 \leq y < 1.5$ or In, Sc; $0 \leq y < 0.8$.

As will be described in detail hereinafter, the magnetic circular dichroism of magnetic garnet material proves to be capable of being considerably increased by the substitution of Bi-ions.

The invention also comprises a method of increasing the magnetic circular dichroism (MCD) of a magnetic garnet, in which the garnet material is grown in an environment in which the Bi-ions are present on a transparent substrate.

In magneto-optic memories the rotation element generally consists of a magnetic material grown on a transparent substrate which usually has the form of a thin film in which the easy axis of magnetization is normal to the plane of the film. The state of the magnetization of the film is changed by local heating of the material, usually with the simultaneous application of a magnetic field in a direction normal to the plane of the film. In this connection two methods are known. In one of these, known as Curie point writing, the magnetic film is heated above its Curie temperature causing the magnetization to become zero. The second mode, compensation point writing, involves a magnetic material having a compensation temperature, at which temperature the net magnetization is zero. The material is maintained at this temperature and any temperature rise then causes a decrease in magnetic coercivity. Simultaneous application of a magnetic field then causes the magnetization of the heated area to reverse. The above two modes of varying the state of magnetization are known as thermomagnetic writing.

It is desired that the Curie temperature or compensation temperature should be near room temperature. The invention also provides a means of adjusting the compensation or Curie temperature of a magnetic garnet so that predetermined values for these constants can be obtained. Replacing iron ions by non-magnetic ions reduces the Curie temperature; the compensation temperature can be adjusted with rare earth ions, for example Gd.

For reading out in the transmission mode, the optic density must be such that a detectable light level is passed. The invention also provides a means of reducing the optic absorption of a magnetic garnet.

Figure 2:
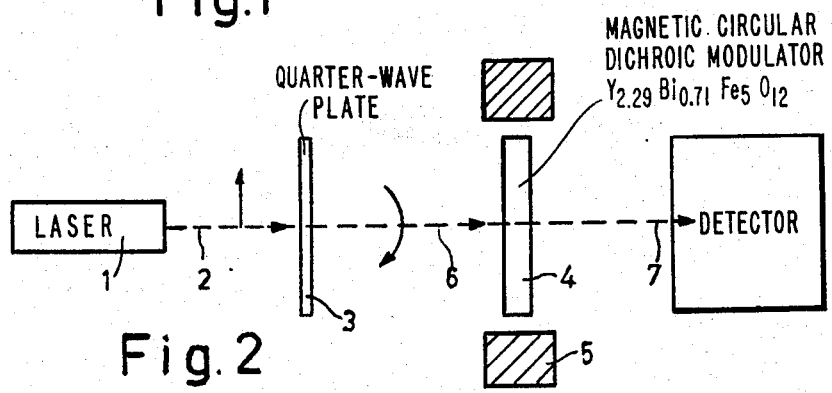

By way of example, embodiments of the invention will be further described with reference to the accompanying drawings in which:

FIG. 1 is a graph showing MCD (in $cm^{-1}$) against wavelength (in nanometers) of the transmitted light, and, FIG. 2 is a sketch of an optical modulator device.

The present invention is based on the discovery that it is possible to influence the MCD of certain magnetic garnets by the incorporation of bismuth. FIG. 1 in Curve A gives the variation in MCD (in $cm^{-1}$) as a function of the wavelength (in nanometers) of the transmitted light for a specimen of YIG ($Y_3Fe_5O_{12}$). The MCD value reaches a peak of 750 $cm^{-1}$ at a wavelength of about 480 nanometers.

By a suitable modification of YIG, a proportion of bismuth was substituted for yttrium so that a compound having the formula $Bi_xY_{3-x}Fe_5O_{12}$ where $x = 0.264$ was formed. A specimen of this compound when measured under the same conditions as for the previous YIG sample gave the result indicated by Curve B. The value for MCD was thus found to be considerably enhanced throughout the observed range.

A different specimen in which bismuth corresponding to a value of $x$ equal to 0.71 was present was next prepared. When a specimen of this compound was measured under the same conditions a result corresponding to Curve C was obtained. This showed that the greater proportion of bismuth had caused a further increase in the MCD value. For the compound $Bi_{0.71}Y_{2.29}Fe_5O_{12}$, the magnitude of the MCD was shown to be about fifteen times greater than that for YIG at the wavelength 515 nanometers.

An enhancement in MCD of this magnitude makes the bismuth substituted garnet to be a very suitable material for use in an optical storage device. Information can be read out by comparing the intensity of a passed beam of circularly polarised visible light.

It is particularly convenient that the use of MCD can be extended to the visible part of the spectrum. At a wavelength of, for example, 515 nanometers can enable an argon ion laser to be used for the read-out operation. The invention therefore can enable lasers and other light sources to be used that operate outside the UV region. This is an advantage also because UV light can sometimes have a harmful effect on other elements in the system.

Further experiments showed that the presence of bismuth enhances the MCD especially in the wavelength range 4400A to 6500A. Incorporation of ions of type R, which lead to compounds with lattice constants larger than that of $Y_3Fe_5O_{12}$, allow higher values of $x$ to be achieved. Incorporation of ions type A allows the Curie temperature, Tc, to be reduced to below that of $Y_3Fe_5O_{12}$ (YIG) to some suitable temperature. In the case of R = Gd. etc., $x$ and $y$ may be adjusted so that the compensation temperature is around ambient. Some of the ions of type A reduce the optical absorption below that of YIG.

A measure of the read-out efficiency is the ratio $\Delta I/I_o$, where $\Delta I$ is the change in the intensity of light transmitted through the film, when the direction of magnetisation is reversed, and $I_0$ is the intensity of the incident light beam. $\Delta I/I_0$ is of order $10^{-4}$ for MnBi and GdIG using Faraday effect read-out. For GdIG, in the wavelength range from 390–450 nm, $\Delta I/I_0$ ratios of order $2 \times 10^{-1}$ have been reported. The present invention enables comparable or even high ratios of $\Delta I/I_0$ to be achieved, while extending the wavelength range to 550 nm. In particular, the dichroism is significantly increased at the important wavelengths of 488 and 515 nm of the argon ion laser.

One advantage of using MCD for read-out is that it is possible to modulate the sensing beam between right and left circularly polarised light and phase sensitive detect (PSD) the passed signal-carrying beam. As the magnetisation is reversed, the phase sensitively detected signal reverses sign. Thus the signal to noise can be improved. In addition, positive and negative signals can be realised for the different directions of magnetisation. For Faraday rotation read-out, the analyser and polariser normally enclose an angle of 45° and only the change in intensity of transmitted light is detected as the direction of magnetisation is reversed. PSD could not be used for this configuration. It is possible to use PSD if the analyser and polariser were crossed, however in this case the transmitted light is attenuated because the analyser and polariser are crossed.

The use of MCD in modulators consists of using circularly polarised light, and changing the magnetisation of the material.

An example of such a kind of optical modulator is depicted in FIG. 2.

This shows a laser light source 1 which produces a light beam 2 of plane polarised light. The beam 2 is passed through a quarter-wave plate 3 from which it emerges as a circularly polarised beam 6. The circularly polarised beam is next passed through a wafer 4 of bismuth-substituted YIG. The wafer 4 is arranged within a coil 5. A current flowing within coil 5 can be varied to provide a variable magnetic field by means of which a signal to be transmitted is applied to the wafer 4.

In this way, the circularly polarised light beam 7 emerging from the system is modulated in a manner suitable for transmitting the signal applied to coil 5, and deleted by a detected 8.

The foregoing descriptions of embodiments of the invention have been given by way of example only and a number of modifications may be made without departing from the scope of the invention. For instance, in the construction of the optical modulator, the laser which acts as a source of plane polarised light could be replaced by a filament lamp (which provides unpolarised light) used in conjunction with a suitable polarising filter.

We claim:

1. In a magneto-optic device having a transparent magneto-optic element capable of altering its transmission properties to light having a circularly polarized component at room temperature and where the material of the element exhibits the intrinsic property of magnetic circular dichroism, means to convey through the element a circularly polarized light beam, and means to detect intensity variations of the circularly polarized light beam caused by differences in the magnetization state of the element, the improvement wherein said element consists of a magnetic garnet material having the composition $R_{3-x} Bi_x Fe_{5-y} A_y O_{12}$, where R = Y, Nd, Sm, Eu, Gd; $0.2 < x < 2.0$ and for A = Ga, Al, $0 \leq y \leq 1.5$, and for A = In, Sc, $0 \leq y < 0.8$.

2. A device as claimed in claim 1, wherein R is Y, $x = 0.264$ and $y = 0$.

3. A device as claimed in claim 1, wherein R is Y, $x = 0.71$ and $y = 0$.

* * * * *